June 19, 1951 W. B. SHIRK 2,557,318

TONE COMPENSATED VOLUME CONTROL

Filed Sept. 1, 1949 3 Sheets-Sheet 1

INVENTOR.
WALTER B. SHIRK
BY
Alden D. Redfield
Charles M. Hogan
ATTORNEYS

June 19, 1951 W. B. SHIRK 2,557,318

TONE COMPENSATED VOLUME CONTROL

Filed Sept. 1, 1949 3 Sheets-Sheet 2

INVENTOR.
WALTER B. SHIRK
BY
Alden D. Redfield
Charles M. Hogan
ATTORNEYS

June 19, 1951 W. B. SHIRK 2,557,318

TONE COMPENSATED VOLUME CONTROL

Filed Sept. 1, 1949 3 Sheets-Sheet 3

INVENTOR.
WALTER B. SHIRK
BY
Alden D. Redfield
Charles M. Hogan
ATTORNEYS

Patented June 19, 1951 2,557,318

UNITED STATES PATENT OFFICE 2,557,318

TONE COMPENSATED VOLUME CONTROL

Walter B. Shirk, Cincinnati, Ohio, assignor to Avco Manufacturing Corporation, Cincinnati, Ohio, a corporation of Delaware Application September 1, 1949, Serial No. 113,529

10 Claims. (Cl. 178—44)

The present invention relates to improvements in acoustically compensated volume controls for radio receivers and the like.

As stated by Terman, Radio Engineering (p. 328, third edition, McGraw-Hill, New York, 1947), "The characteristics of the ear are such that the apparent loudness of low-frequency tones relative to middle- and high-frequency tones is less as the volume level of reproduction is reduced. In order to increase the apparent loudness of the low-frequency tones, the volume control may be so arranged that the reduction in gain for low-frequencies is less than for middle- and high-frequency components."

The conventional tone-compensated volume control is shown in Figs. 6–56, page 328, of Terman's above-cited publication, and in Figs. 1 and 2 of the drawings in this application. It is shown in conjunction with a diode peak detector comprising an input winding 13, a tube section having an anode 11 and a cathode 12, and the usual parallel combination of charging capacitor 14 and load resistance 15, 16, 17. Resistance 16, 17 is a potentiometer-type volume control, which is coupled to the control electrode 22 of an audio amplifier stage by coupling capacitor 21 and grid resistor 23. The audio amplifier includes a triode section having a cathode 12, control electrode 22, and anode 24, in the same envelope 10 as the diode. Optionally the diode and triode elements may be placed in separate envelopes 8, 9, the Fig. 2 showing being the full equivalent of Fig. 1. The tone compensation feature resides in a series combination of resistor 18 and capacitor 19, placed in shunt with resistor 17, between tap B and terminal A. This typical tone-compensated volume control is essentially a series-parallel combination, the series elements comprising resistance 15, 16 and the parallel elements comprising two branches. One branch consists of resistance 17. The other branch is a network which has an A. C. impedance which decreases with increase in frequency. This branch comprises a series combination of a resistor 18 and a capacitor 19.

The impedance 18, 19 attenuates high-frequency components to a greater degree than low- or middle-frequency components. As the adjustable contact is moved from point C (high potential terminal of resistor 16) to point B (junction of the two branches) the effect of the network 18, 19 becomes more pronounced. This effect is measured by the difference between the impedance of the D. C. path, formed by element 17 and that portion of resistor 16 below contact 20, and the impedance of the A. C. path, formed by elements 18 and 19 and that portion of resistor 16 below contact 20. In other words, the shunting effectiveness of the A. C. path 18, 19 increases as contact 20 moves from point C to point B, whereby the bass components are boosted as volume level is decreased. As contact 20 moves from point B to point A, volume is decreased without further discrimination in favor of the bass components.

It will be observed that resistor 23 is the grid leak for the first audio amplifier stage and that capacitor 21 is the grid capacitor. A serious disadvantage of the prior art circuit shown in Figs. 1 and 2, resides in the fact that at the high volume levels prevailing when contact 20 approaches point C, the maximum output point or high potential terminal of resistor 16, grid overload occurs in the audio amplifier stage including elements 22, 24. Such overload is due to periodic grid blocking. The resultant distortion is audible and most disagreeable to the ear. It is generally considered that this distortion is caused by the fact that as contact 20 approaches point C, the low-frequency components are excessive in voltage. The more pronounced the low-frequency components of a passage of music, for example, the more aggravated this undesirable condition becomes.

It is currently accepted that the energy content and voltage levels of the low-frequency components are such that they periodically charge the grid capacitor 21 to a grid-blocking condition. The recovery time of the time-constant circuit 21, 23 is, in general, governed by the necessities of making grid resistor 23 sufficiently high to avoid undesirable shunting effects and of making coupling capacitor 21 sufficiently high to prevent excessive loss of low-frequency components at low levels. Since the last-mentioned considerations control the selection of elements 21 and 23, it has heretofore been considered that overloading of the audio stage by excessive low-frequency components at high volume levels is an inherent defect of acoustically compensated volume controls of the general type illustrated in Figs. 1 and 2.

The present invention is directed to the solution of this problem. It is the primary object of the invention to provide a volume control which maintains essentially the same bass boost characteristics as the conventional circuit, at tap level (i. e., when contact 20 is at point B, the junction of resistors 17, 18) or below tap level but which avoids the undesirable overload condition by limiting or attenuating the low-frequency voltages applied to the first audio frequency amplifier at volume levels above tap level (i. e., when contact 20 is above point B).

In accordance with the invention this object is achieved, overload avoided and the problem solved by providing an acoustically compensated volume control comprising a pair of terminals (E, A') constituting an input circuit to which audio-frequency signals are applied, a pair of two-branch parallel combinations in series between said terminals, one of said combinations comprising a branch consisting of a first resistor 16′ and a branch consisting of a second resistor (27) and a first capacitor (26), the latter two elements being connected in series to provide a series path which attenuates low-frequency signals, the other combination comprising a branch consisting of a third resistor (17′) and a branch consisting of a fourth resistor (18′) and a second capacitor (19′), the latter two elements being connected in series to provide a shunt path which effectively attenuates high-frequency signals, and an adjustable contactor (20) for cooperating with said second and third resistors (27 and 17′) to form a potentiometer, one of said terminals (A′) and said contactor (20) constituting an output circuit from which output signals are taken.

For a better understanding of the invention, reference is made to the following description of the accompanying drawings, in which there is disclosed an illustrative preferred embodiment of the invention.

In the drawings:

Figs. 1 and 2 are circuit schematics of a typical prior-art detector-amplifier circuit including a bass compensated volume control, Fig. 1 showing the detector and audio amplifier electrodes in one envelope, while Fig. 2 shows separate detector and audio amplifier tubes;

Figure 6:
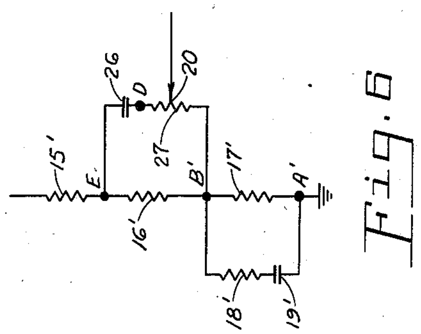
Figure 5:
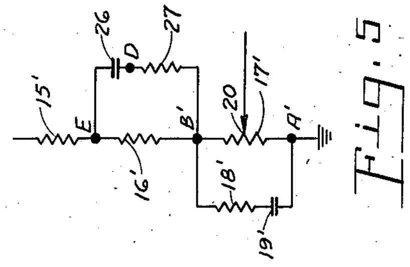
Figure 7:
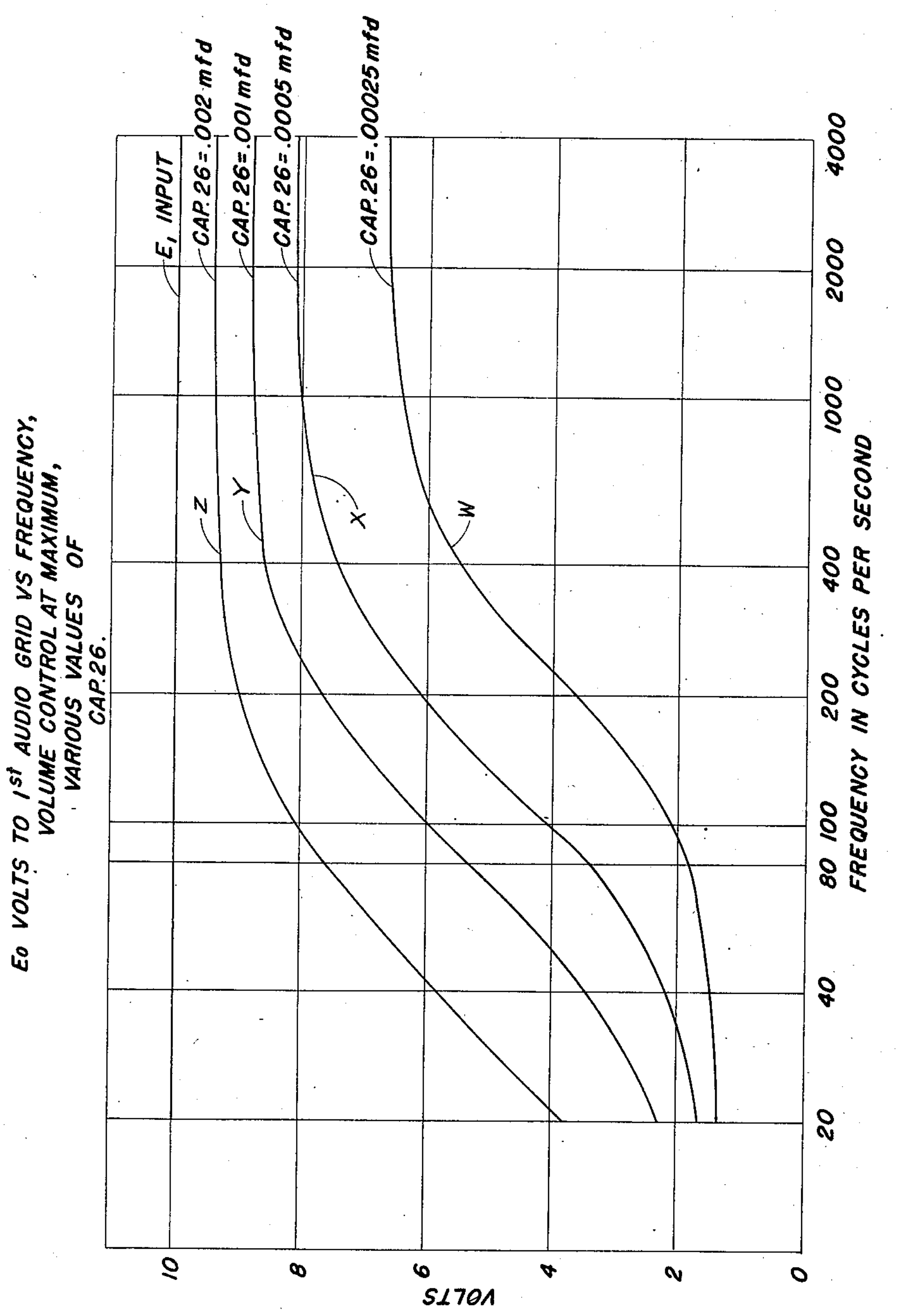
Figure 8:
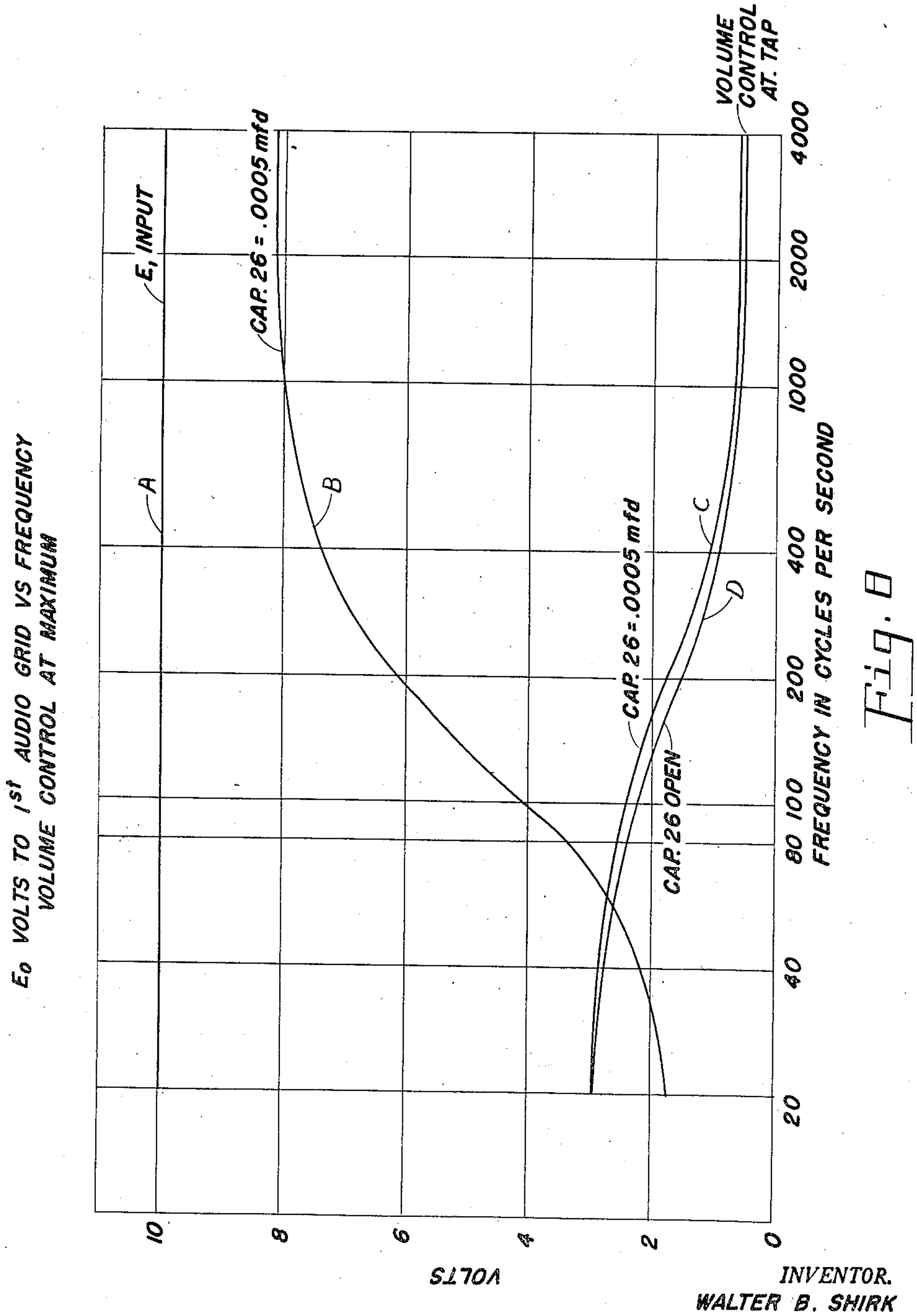

Figs. 5 and 6 are circuit schematics of the same volume control shown in Fig. 4, with components rearranged clearly to show the departures from the prior art, Fig. 5 showing the contactor in position below tap B′ (during which condition the operating characteristics of the volume control are substantially the same as those of the prior art device), and Fig. 6 showing the contactor in position above tap B′ (during which condition the grid-overload disadvantage of the prior art device is eliminated;

Figs. 7 and 8 are sets of curves employed as aids in describing the operation of the invention.

Figure 2:
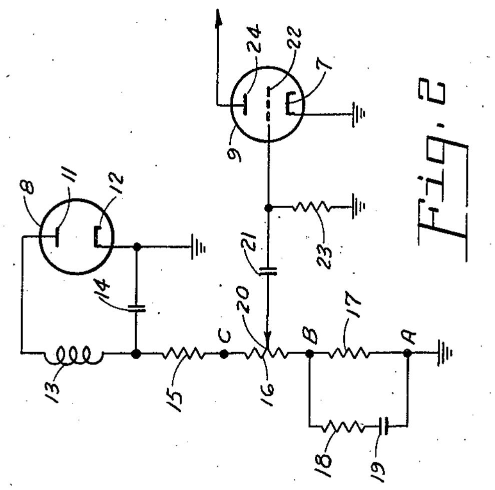
Figure 1:
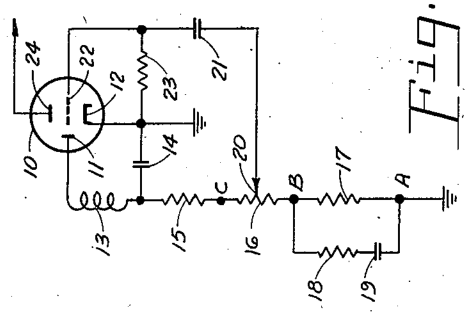

Like reference numerals are employed to designate like elements in the several views. Elements in Figs. 3–6 which correspond to elements in Figs. 1 and 2 are designated by the same reference numerals primed.

Figure 4:
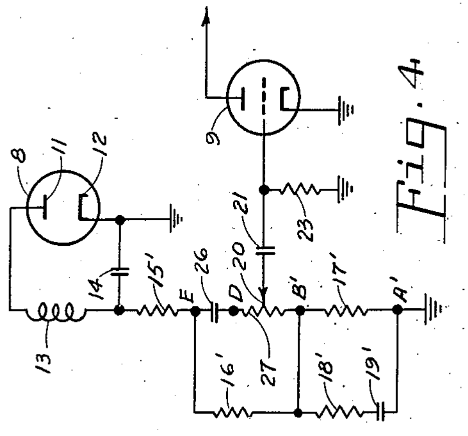

Referring now specifically to Fig. 4, the detector load comprises resistances 15′, 16′, and 17′ in series. The usual compensating network 18′, 19′ is placed in shunt with resistance 17′. Schematically, Fig. 4 differs from the prior art in four respects: First, a series combination of a capacitor 26 and a resistance 27 is connected in shunt with resistance 16′; second, resistor portions 17′ and 27 constitute a potentiometer; third, capacitor 26 is in series with the potentiometer; fourth, resistor 16′ is not a portion of the potentiometer, as in the prior art.

Points E (junction of resistors 15′ and 16′ and capacitor 26) and A′ (junction of resistor 17′ and capacitor 19′, or ground), which may simply be conductive leads, are hereinafter referred to as "input circuit terminals." The detector output, or input signal to the volume control, is applied to these terminals, resistor 15′ being disregarded for the present. The novel volume control comprises a pair of two-branch combinations arranged in series between these terminals.

One of these combinations comprises a branch, consisting of a first resistor 16′, and a parallel branch, consisting of a second resistor 27 and a first capacitor 26, the elements 26 and 27 being connected in series. The other combination comprises a branch, consisting of a third resistor 17′, and a parallel branch, consisting of a fourth resistor 18′ and a second capacitor 19′, the elements 18′ and 19′ being connected in series. Resistor 16′ completes the D. C. path across capacitively reactive branch 26, 27. Resistances 17′ and 27 are portions of a potentiometer, between which is a tap located at B′. This potentiometer includes an adjustable conductive contact 20. The output terminals comprising ground (at A′) and contact 20 are coupled to the input of the audio amplifier stage.

Figure 3:
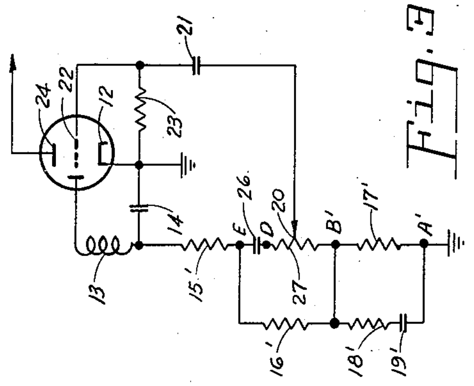
Figs. 3 and 4 are circuit schematics of an improved bass compensated volume control in accordance with the invention.

As shown in Figs. 3 and 4, the novel volume control may be used with a single-envelope diode-triode tube or with separate detector and amplifier tubes.

Referring now to Fig. 5 and to curves A, C, and D of Fig. 8, the operation of the volume control when manually adjustable contact 20 is at or below tap level (B′) is first described. Under this assumed condition the operation is substantially the same as that of the prior-art device (Figs. 1 and 2) and the desirable characteristics of the latter are retained. Curves A, C, and D show various voltage-frequency characteristics, voltages being plotted as ordinates and frequencies as abscissae on a frame of Cartesian coordinates. Curve A represents $E_1$ or input volts (between the junction of resistor 16′ and capacitor 26 and ground). Curves C and D represent $E_0$ or output volts (between contact 20 and ground). Curves C and D were taken with contact 20 at tap level (B′). Curve C represents output volts, capacitor 26 having a value of 0.0005 mfd. Curve D represents output volts when the branch 26, 27 is open-circuited. It will be observed that when contact 20 is at or below tap level, the output voltage-frequency characteristic of the novel device (curve C) is substantially the same as that of the prior art device (curve D). Thus the present invention retains the advantages of the prior art, volume being reduced as the contact 20 is moved from tap level (B′) toward ground, without any alteration in the relative attenuations of low and high-frequency components.

Referring now to curve B, Fig. 8, and to Fig. 6, the operation of the volume control when the contact 20 is above tap level (i. e., when the contact is between points B′ and D is next described. Under this condition the operation departs substantially from the prior art device. Curve B was plotted from measurements taken when contact 20 was at point D, or at maximum volume level. It represents volts output between contact 20 and ground. In the prior-art device of Figs. 1 and 2, grid overload in the audio stage, with serious distortion, becomes more pronounced as the contact 20 approaches point C, maximum volume level, due to the excessive magnitude of the low-frequency components. As clearly shown by curve B, Fig. 8, the improved volume control in accordance with the invention attenuates the low frequency components more than the high and middle-frequency components. When contact 20 is at point D, maximum volume level, grid blocking does not occur. I have found that a receiver including volume control having the parameters mentioned below may be turned up to full volume level without audible distortion. This feature is of particular importance in sales demonstrations of receivers, because a sale or loss-of-sale often depends on the audible performance of a radio receiver under this condition.

As contactor 20 is moved from point D toward ground the effectiveness of the branch circuit 18', 19' as a shunt for the higher-frequency components increases, and the bass components are effectively "boosted" relative to the middle and low-frequency components.

The following illustrative parameters have been found satisfactory in one successful embodiment of the invention:

| | | |
|---|---|---|
| Capacitor 14 | mfd | 0.0002 |
| Resistor 23 | megohms | 10 |
| Capacitor 21 | mfd | 0.002 |
| Potentiometer 17', 27 | megohms | 3 |
| Resistance 17' | ohms | 300,000 |
| Resistor 16' | do | 680,000 |
| Resistor 18' | do | 47,000 |
| Capacitor 19' | mfd | 0.005 |
| Resistor 15' | ohms | 100,000 |

The magnitude of the low-frequency components at maximum volume level is controlled in part by the value of capacitor 26. This value should not be so small as to attenuate components which do not cause grid blocking. It should not be so large as to fail to attenuate undesired components. A value of 0.0005 mfd. (curve X, Fig. 7) has been found satisfactory.

Fig. 7 comprises curves W, X, Y, and Z showing the output voltage-frequency characteristics, at full volume, for various values of capacitor 26. When a value of 0.0005 is chosen, the 100 cycle voltage at full volume is approximately 171% of that at tap level (curve X).

It will be observed that the sum of the resistance values of 17' and 16' is 980,000 ohms, which closely approximates the conventional one megohm for the sum of the values of resistances 17 and 16. For that reason the operation of the improved volume control closely approximates the operation of the prior-art device (Figs. 1 and 2) when contact 20 is below tap level (B').

While there have been shown and described what are at present considered the preferred embodiments of the present invention, it will be obvious to those skilled in the art that various modifications and substitutions of equivalents may be made therein without departing from the true scope of the invention as defined by the appended claims.

I claim:

1. An acoustically compensated volume control comprising a pair of terminals constituting an input circuit to which audio-frequency signals are applied, a pair of two-branch parallel combinations in series between said terminals, one of said combinations comprising a branch consisting of a first resistor and a branch consisting of a second resistor and a first capacitor, the latter two elements being connected in series to provide a series path which attenuates low-frequency signals, the other combination comprising a branch consisting of a third resistor and a branch consisting of a fourth resistor and a second capacitor, the latter two elements being connected in series to provide a shunt path which effectively attenuates high-frequency signals, and an adjustable contactor for cooperating with said second and third resistors to form a potentiometer, one of said terminals and said contactor constituting an output circuit from which output signals are taken.

2. A tone-compensated volume control comprising a potentiometer consisting of a resistor having a fixed tap between two resistance portions and an adjustable contactor, means in series with one of said portions for attenuating low-frequency components of an applied signal, means connected to said tap and in shunt with the other of said portions for attenuating high-frequency components of an applied signal and a resistor in shunt with the first portion and the first attenuating means and in series with the second portion for completing a D. C. path across the first-mentioned means.

3. A tone-compensated volume control so arranged as to prevent grid-blocking of a cascaded audio stage comprising the combination of a potentiometer having a fixed tap between two resistance portions and an adjustable contactor, a capacitor in series with one of said portions for attenuating the low-frequency components of an applied signal, a resistor in shunt with said portion and said capacitor for completing a D. C. path across said portion, and means in shunt with the whole of the other of said portions for attenuating the high-frequency components of said signal.

4. An acoustically compensated volume control comprising a pair of two-branch circuits in series across which an input signal is applied, each of said circuits comprising a resistive and a capacitively reactive branch including resistance, and an adjustable contactor, said adjustable contactor and the resistance branch of one of said circuits and the resistance included in the reactive branch of the other of said circuits constituting an output potentiometer.

5. An acoustically compensated volume control comprising a pair of two-branch circuits in series across which an input signal is applied, each of said circuits comprising a resistive and a capactively reactive branch including resistance, and an adjustable contactor, said adjustable contactor and the resistance branch of one of said circuits and the resistance included in the reactive branch of the other of said circuits constituting an output potentiometer having a total resistance value on the order of 3 megohms.

6. An acoustically compensated volume in accordance with claim 1 in which the first resistor has a value on the order of 680,000 ohms.

7. An acoustically compensated volume control in accordance with claim 6 in which the second resistor has a value on the order of 2.7 megohms.

8. An acoustically compensated volume control in accordance with claim 7 in which said first capacitor has a magnitude on the order of 0.0005 microfarad.

9. An acoustically compensated volume control in accordance with claim 8 in which the third resistor has a value on the order of 300,000 ohms.

10. An acoustically compensated volume control in accordance with claim 9 in which the fourth resistor and second capacitor have values, respectively, on the orders of 47,000 ohms and 0.005 microfarad.

WALTER B. SHIRK.

REFERENCES CITED

The following references are of record in the file of this patent:

UNITED STATES PATENTS

| Number | Name | Date |
|---|---|---|
| 2,037,842 | Wolff | Apr. 21, 1936 |
| 2,322,558 | Bachman | June 22, 1943 |